United States Patent [19]

Thompson et al.

[11] Patent Number: 5,626,090
[45] Date of Patent: May 6, 1997

[54] PLANTING HOLE BURNING APPARATUS

[76] Inventors: Kenneth E. Thompson; Harold F. Guerndt, Jr., both of P.O. Box 1017, Zolfo Sprongs, Fla. 33890

[21] Appl. No.: 672,273

[22] Filed: Jun. 26, 1996

[51] Int. Cl.$^6$ .................................................. A01C 11/00
[52] U.S. Cl. ........................... 111/200; 47/9; 126/271.1; 126/401; 264/154
[58] Field of Search .................... 47/9; 111/102, 111/199, 200; 126/271.1, 401; 264/154

[56] References Cited

U.S. PATENT DOCUMENTS

| | | | |
|---|---|---|---|
| 610,612 | 9/1898 | Setter. | |
| 3,154,032 | 10/1964 | Kappelmann | 111/102 X |
| 3,460,493 | 8/1969 | Stephenson et al. | 111/102 |
| 4,306,508 | 12/1981 | Skipper | 111/102 X |
| 4,458,608 | 7/1984 | DuBrucq | 111/102 |
| 4,941,416 | 7/1990 | Faulring | 111/102 |

Primary Examiner—Terry Lee Melius
Assistant Examiner—Christopher J. Novosad
Attorney, Agent, or Firm—Charles J. Prescott

[57] ABSTRACT

A planting hole burning apparatus and method of forming a row of spaced planting holes through a plastic film positioned atop a seed growing bed. The apparatus includes ground engaging wheels which support a frame. A heat dispenser rotor is connected to the frame for rotation about an axis transverse to the direction of travel of the apparatus in use. The rotor is made to rotate at a speed proportional to the ground speed of the apparatus and such that a distal end of the rotor moves arcuately in very close proximity to the plastic film at the bottom of the arc. Gearing and rotor length are selected so that the arcuate speed of the distal end of the rotor during its rearward travel at the bottom portion of its swing is equal to the ground speed of the apparatus. Various means for heating one or more distal ends of the rotor for burning the planting holes through the plastic film while rotating in close proximity to the plastic film are provided.

15 Claims, 2 Drawing Sheets

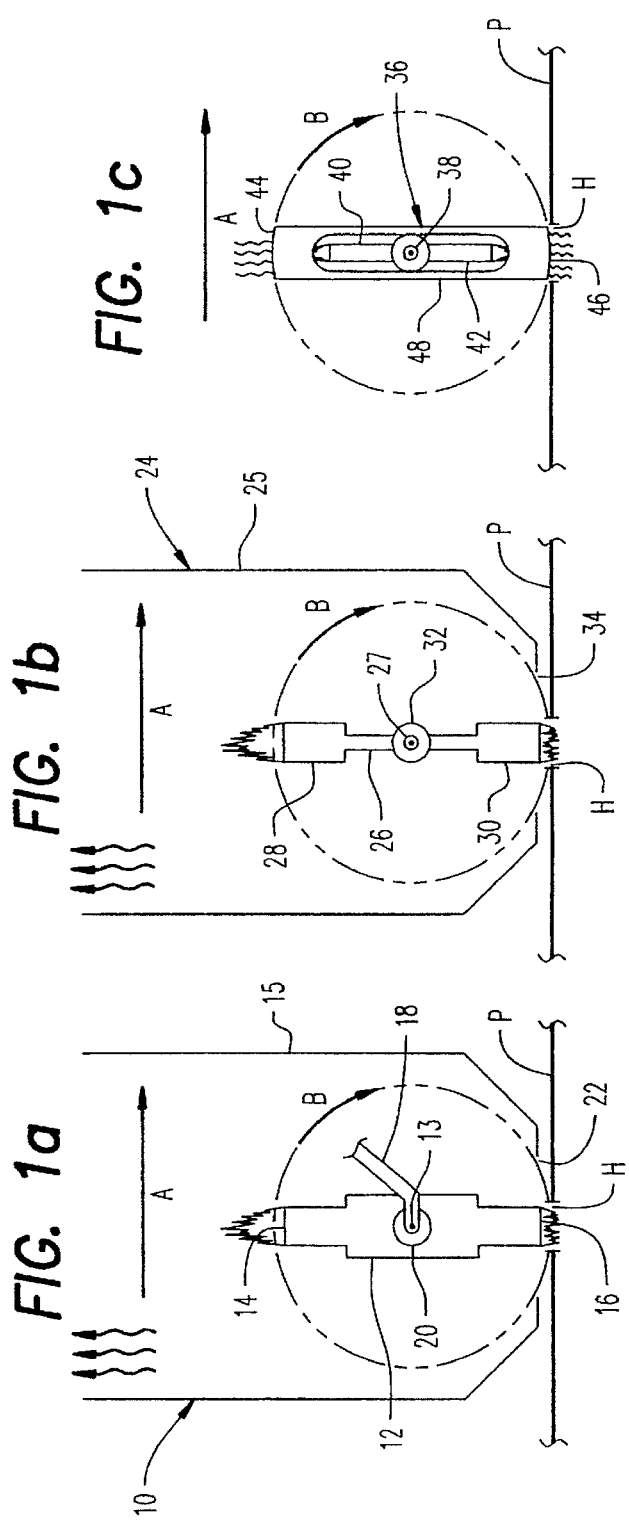
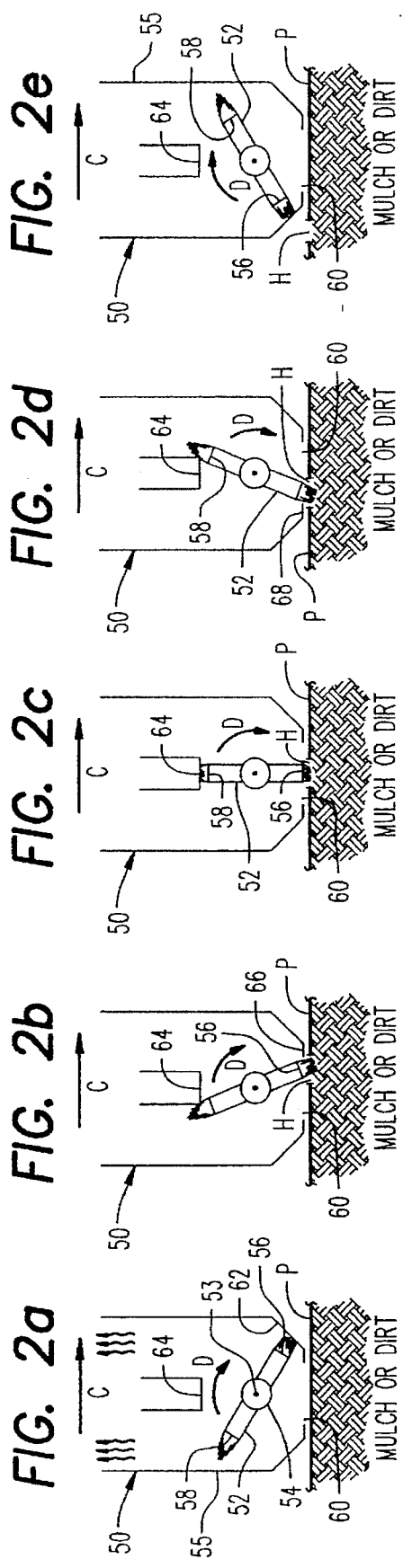

5,626,090

PLANTING HOLE BURNING APPARATUS

BACKGROUND OF THE INVENTION

SCOPE OF INVENTION

This invention relates generally to a germinated seed planter, and more particularly to an apparatus for forming rows of spaced openings through a plastic film covering a plant growing substrate such as dirt, growing mulch and the like.

PRIOR ART

In many areas, the utilization of plastic film laid atop growing mulch dirt and mixtures thereof is well known and utilized. The plastic film retains ground moisture and accelerates growing of the seeds and germinated plants.

After the plastic film is laid atop the growth supporting substrate of mulch, soil and the like, holes must be formed in the plastic film for seed and germinated plant insertion into the growth substrate. One standard well-Known technique for accomplishing this initial step is by punching holes in the plastic film using a suitably structured pointed implement.

One apparatus for thermally perforating longitudinally spaced plant growth holes in the plastic film or mulch sheet which has previously been laid atop a planting substrate row is disclosed in U.S. Pat. Nos. 3,333,557 invented by Kappelmann, et al. This apparatus utilizes an induction coil heated member to melt holes in the plastic mulch sheet subsequent to the slitting of the sheet and placement of seeds in the ground below the slit. Each thermally perforated hole is made precisely over the previously placed seed as accomplished by a timed chain and sprocket arrangement. duBrucq has two U.S. Pat. Nos. 4,384,537 and 4,458,608 which disclose a germinated seed planter which includes bullet-shaped burners for melting holes in the plastic covering sheet upon contact.

A planting apparatus with a melter for forming holes in plastic sheeting is taught by Skipper in U.S. Pat. No. 4,306,508. This apparatus teaches an internally heated melting member with means for repeatedly vertically raising and lowering same into and out of contact with the plastic sheet.

In U.S. Pat. No. 4,941,416, Faulring teaches an apparatus for ground engagement during seed planting which includes a mechanism for matching the forward velocity of the apparatus with the rearward velocity of the ground engaging tool at its lowest point during its movement cycle. A vertically actuated burner head is also disclosed for melting perforated holes prior to ground engagement for seed placement.

A very early patent to Setter in U.S. Pat. No. 610,612 teaches an apparatus for burning the seeds of noxious weeds, quite dissimilar to the purpose and structure of the present invention.

The present invention overcomes the generally slow nature of the previous devices for this purpose by teaching an apparatus for the melting or burning of planting holes in plastic film atop a growing bed which, by the synchronization of forward movement with the rearward rotational movement of the plastic melting components in the lower position, facilitates uniform hole burning at increased ground speed velocities for greater time efficiency.

BRIEF SUMMARY OF THE INVENTION

This invention is directed to a planting hole burning apparatus and method of forming a row of spaced planting holes through a plastic film positioned atop a seed growing bed. The apparatus includes ground engaging wheels which support a frame. A heat dispenser rotor is connected to the frame for rotation about an axis transverse to the direction of travel of the apparatus in use. The rotor is made to rotate at a speed proportional to the ground speed of the apparatus and such that a distal end of the rotor moves arcuately in very close proximity to the plastic film at the bottom of the arc. Gearing and rotor length are selected so that the arcuate speed of the distal end of the rotor during its rearward travel at the bottom portion of its swing is equal to the ground speed of the apparatus. Various means for heating one or more distal ends of the rotor for burning the planting holes through the plastic film while rotating in close proximity to the plastic film are provided.

It is therefore an object of this invention to provide an apparatus for the burning of generally uniformly shaped rows of plant seed insertion holes in plastic film covering a seed growing bed.

It is another object of this invention to provide an apparatus for placing seed growing holes in plastic film at higher rates of hole placement for increased time economy.

It is another object of this invention to provide an apparatus for forming a row of placed planting holes through a plastic film positioned atop the seed growing bed which may be propelled manually, self-propelled, pushed or pulled by other farming equipment as desired.

In accordance with these and other objects which will become apparent hereinafter, the instant invention will now be described with reference to the accompanying drawings.

BRIEF DESCRIPTION OF THE DRAWINGS

FIG. 1a is a side elevation schematic view of one embodiment of the invention.

FIG. 1b is a side elevation schematic view of another embodiment of the invention.

FIG. 1c is a side elevation schematic view of a third embodiment of the invention.

FIG. 2a to 2e are side elevation schematic views of the preferred embodiment of the invention showing the rotor (52) at various rotational orientations of its duty cycle.

DETAILED DESCRIPTION OF THE INVENTION

Figure 5:
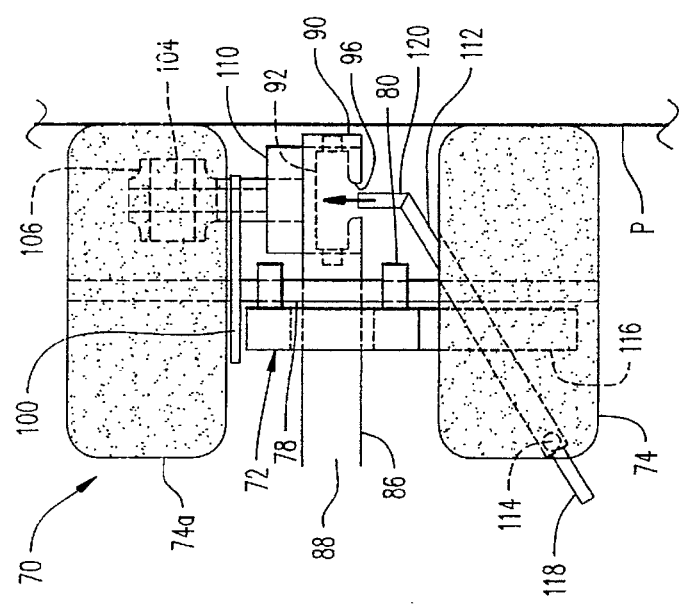
FIG. 5 is an end elevation view of FIG. 3.

Referring now to the drawings, and particularly to FIGS. 1a to 1c, three embodiments in principle of the invention are there shown generally at numerals 10, 24 and 36, embodiment 10 being preferred. In FIG. 1a, this embodiment 10 includes a heat dispensing rotor 12 mounted for rotation in the direction of arrow B about an axis 13 which is generally transverse to the direction of linear movement over ground shown by arrow A. A torch 18 injects flame through aperture 20 into the hollow rotor 12. These flames exit through either open end 14 and 16 of the rotor 12 as indicated.

An enclosure or case 15 formed of heat resistant metallic panels and the like generally surrounds the rotor 12 on all sides and provides a flame discharge opening 22 at the bottom thereof. This flame discharge opening 22 is positioned in close proximity above a plastic film P which is disposed atop a plant growing substrate such as a mulch or dirt.

As the rotor 12 rotates in the direction of arrow B, one of the open rotor distal ends 14 or 16 moves downwardly and rearwardly in an arc into alignment and registry with the flame discharge opening 22. During this portion of the sequence of operation of the device 10, flames exiting from distal opening 16 as shown burn a hole H into the plastic film P. The sequence is repeated each time one of the distal ends 14 or 16 moves into registry with a flame discharge opening 22.

The parameters of movement, those being ground speed of the device 10 in the direction of arrow A and arcuate velocity of each distal end 14 and 16 in the direction of arrow B, are preestablished to be of equal and oppose values. This equality of velocity at least during the time period during which each distal end 14 and 16 is in alignment with flame discharge opening 22, facilitates the length of time needed for burning of a generally uniform round hole H without exaggeration of the hole H shaped by elongation of the hole H. The direct flame vaporizes the plastic film, leaving little or no residue.

In FIG. 2b, an alternate embodiment of the invention 24 includes a heat dispensing rotor 26 supported for rotation in the direction of arrow A about a hollow shaft 27 which also serves to deliver combustible gas to torches 28 and 30 which comprise the end portions of the rotor 26.

This embodiment 24 also includes a non-combustible enclosure 25 which surrounds the torch 26 on all sides and includes a flame discharge opening 34 centrally positioned at the bottom thereof. As in FIG. 1a, this flame discharge opening 34 is positioned in alignment with, and sized for limited discharge of flame from torches 28 and 30 for burning generally non-elongated, uniformly shaped holes H into the plastic film P. Movement over ground in the direction in the direction of arrow A is matched in ground speed to the rearward arcuate speed of the distal ends of torches 28 and 30 at the bottom of their travel as previously described to minimize or eliminate relative movement of flame and plastic film and, thusly, any substantial, elongation of the hole H.

In FIG. 1c, another embodiment of the invention is shown generally at numeral 36 and includes a heat dispensing rotor 48 mounted for rotation about a hollow shaft 38 which also delivers combustible gas to liquid propane (L.P.) torches 40 and 42. These torches 40 and 42 discharge flames from their distal ends against the generally solid metal surfaces 44 and 46, also referred to as hot metal feet.

As the rotor 48 rotates in the direction of arrow B, each heated foot 44 and 46 comes in direct contact with the plastic film P to melt and vaporize the plastic and form hole H therethrough. The temperature of these heated feet 44 and 46 is maintained at a temperature sufficient to virtually vaporize the plastic film so as to eliminate residue build-up either on the distal ends of the rotor 48 or surrounding each hole H. As in previous embodiments in FIGS. 1a and 1b, this embodiment 40 includes a rear drive mechanism for coordinating the linear speed in the direction or arrow A to be equal to the arcuate speed in the direction of arrow B of the distal ends 44 and 46 of rotor 48 so as to minimize any elongation of hole H.

A primary benefit of this timed "zero" relative movement between the heat melting source and the plastic film is the ability to increase the ground speed to about twice that of conventional equipment.

Referring now to FIGS. 2a to 2e, the schematic operation of the preferred embodiment through its entire duty cycle is there shown generally at numeral 50. This embodiment 50 is substantially similar in principle to the embodiment of the invention 10 and 24 shown in FIGS. 1a and 1b, respectively. A heat dispensing rotor 52 is mounted for rotation about a transverse axis 53 spaced above and generally parallel to the plastic film P which covers a roll of mulch or dirt as a growing medium or substrate. Flame from an L.P. torch (not shown) is delivered into the heat dispensing rotor 52 through hollow hub 54, the flame then being redirected radially outwardly through the hollow interior of the rotor 52 for discharge through open distal ends 56 and 58 as shown.

As previously described in FIGS. 1a and 1b, this embodiment 50 includes a hollow metal enclosure 55 which surrounds the rotor 52 and provides a flame discharge opening 60 at the bottom thereof. The upper end of enclosure 56 is opened for discharging excess heat build-up within the enclosure 55. In FIG. 2a, the rotor 52, rotating in the direction of arrow D, is shown in an orientation wherein the flame discharging from open distal end 56 strikes against panel 62 to upwardly dissipate the majority of the heat from enclosure 55. In FIG. 2b, the flame has cleared panel portion 66 and has entered into and aligned with flame discharge opening 60 so as to impinge upon the plastic film P and begin to burn hole H therethrough.

In FIG. 2c, the rotor 52 is shown in upright orientation wherein flame discharging from open distal end 56 continues to burn hole H through the plastic film P. A suitable drive mechanism (not shown) rotates the rotor 52 at an angular speed in the direction of arrow D such that the flame discharging from each open distal end 56 and 58 moves rearwardly a distance equal to the ground speed of the device 10 in the direction of arrow C. This important feature of the invention is provided so that the duration of flame contact for burning hole H is sufficient for this purpose yet does not elongate or otherwise the shape of hole H by relative movement therebetween during this burning period. Establishing the angular speed of the distal ends 56 and 58 to be equal to linear ground speed in the direction of arrow C is accomplished by mathematical calculations for this purpose.

In FIG. 2d, the rotor 52 has moved angularly in orientation to a point where surface 68 of enclosure 56 begins to prevent the flame discharging from the torch 52 from further striking the plastic film P. Then, at FIG. 2e, all of the heat from the flame discharge is directed upwardly through the open end of enclosures 55.

To maximize the flame reaching the plastic film P for more quickly and completely burning hole H, when one of the open distal ends 56 is centrally positioned within the frame discharge opening 60, a flame shield or blocking member 64 is positioned within enclosure 55 to be in close proximity to the open upwardly facing distal end 58 so as to substantially block flame from discharging therefrom. When this occurs, the majority of the flame entering into the rotor 52 is then directed downwardly through open distal end 56.

It should now be obvious and within the scope of this invention to provide as many functional open distal ends for the rotor as desired. Although only two such distal ends are described, one or more such open distal ends are within the intended scope of this invention as well.

Figure 3:
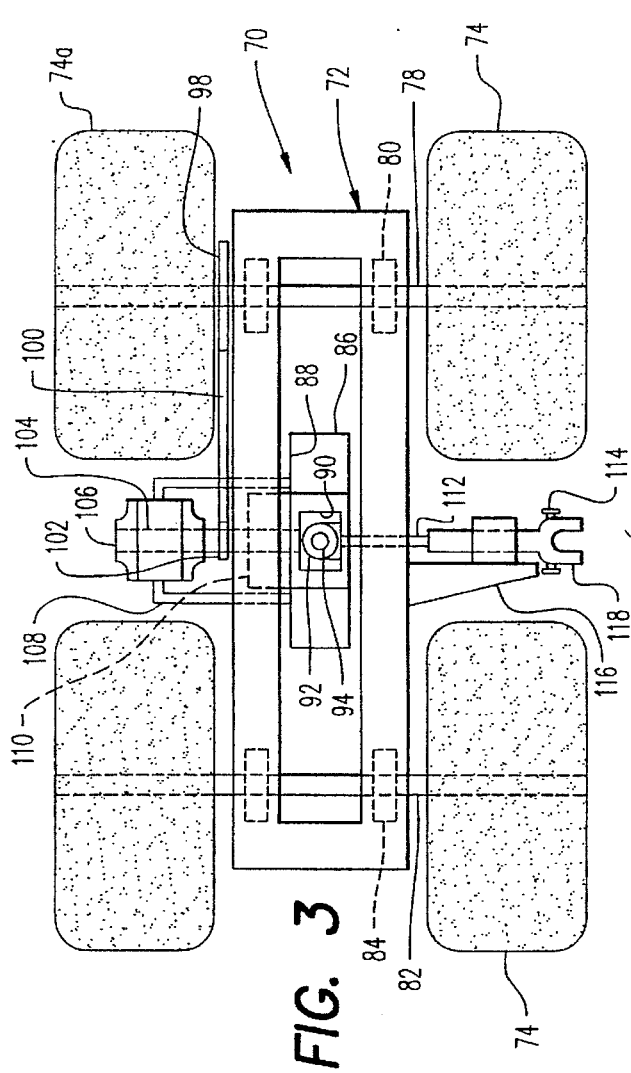
FIG. 3 is a top plan simplified schematic view of a prototype embodiment of the invention.
Figure 4:
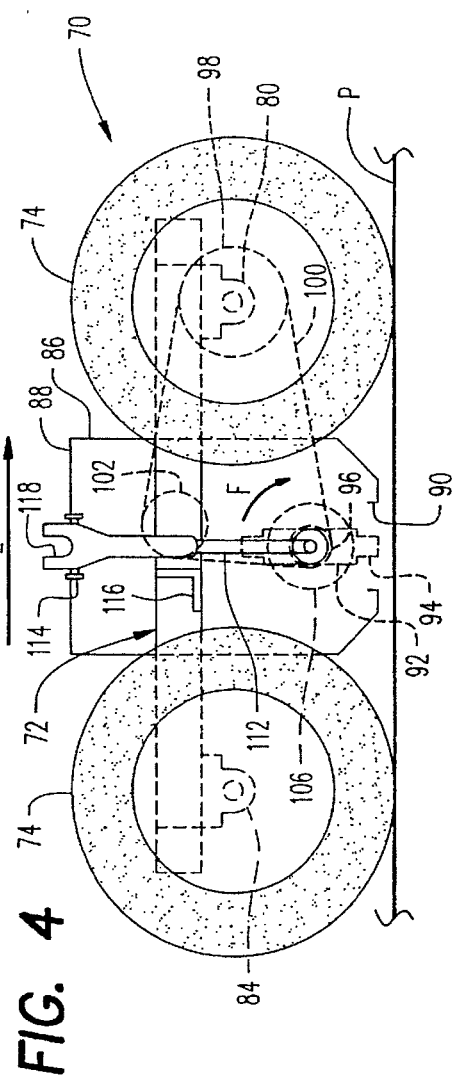
FIG. 4 is a side elevation view of FIG. 3.

Referring now to FIGS. 3 to 5, a schematic of an actual prototype device including the structural features in the embodiment of the invention shown in FIG. 1a is there shown generally at numeral 70. This apparatus 70 includes a rigid frame 72 which is supported above ground by four wheels 74 mounted for rotation on axles 78 and 82. These axles 78 and 82 are generally bearing-supported at 80 and 84 connected to frame 72.

A flame dispensing rotor 92 is rotatably mounted about a transverse axis on shaft 104 supported by bearing 106 within a rigid, hollow enclosure 86 which, in turn is connected to frame 72 This rotor 92 is substantially the same as rotor 12 in FIG. 1a and is adapted in its hollow interior to receive flame from torch 112 through opening 96. The torch 112 is operably connected at 118 to a supply of combustible gas (not shown). Knobs 114 regulate combustible gas flow. Adapter 118 and torch 112 are supported by support arm 116.

As in FIG. 1a, flame from L.P. torch 112 is introduced into the hollow interior of rotor 92 for dispersement through each open distal end 94 of the rotor 92. The rotor enclosure 86 includes a flame discharge opening 90 at the bottom thereof structured and sized as previously described which is positioned in close proximity above the plastic film P as disposed atop a row of plant seed growing substrate. Each discharge end 94 of the rotor 92 is thus periodically during revolution of rotor 92 in the direction of arrow F aligned with this flame discharge opening 90 for sequentially burning holes in the plastic film P into a row of such holes as previously described.

To establish and maintain equality between the angular velocity of each distal end 94 in the direction of arrow F and the lineal ground speed of the apparatus 70 in the direction of arrow E, one of the ground engaging wheels 74a is operably connected to a sprocket 98, which, in turn, drives drive chain 100 which, in turn, drives rotor 92. Take-up or idler sprocket 102 is provided for adjusting the tension of drive chain 100 and practical chain geometry. By this arrangement of gears and endless chain drive, the desired equality of velocities between the rotor distal ends 94 and the ground speed of the apparatus in the direction of arrow E is established and maintained at all speeds.

By providing this unique feature of the present invention, the velocity in the direction of arrow E of the apparatus over ground may be significantly increased as compared to other apparatus and devices for this purpose without sacrificing the quality of each hole sequentially burned into the plastic film P. In essence, by maintaining the flame or hot foot contact stationary on plastic film P during the hole burning time period, no elongation or irregularity of the hole thus formed occurs.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A planting hole burning apparatus for forming a row of spaced planting holes through a plastic film positioned atop a seed growing bed comprising:

a frame supported above the bed by spaced rotatable ground engaging wheels;

a heat dispensing rotor connected to said frame for rotation about an axis substantially transverse to a direction of travel of said apparatus;

drive means connected between one of said wheels and said rotor for rotating said rotor at a rotational speed corresponding to a ground speed of said apparatus whereby a first distal end of said rotor passes in close proximity to the plastic film beneath said apparatus at an arcuate speed substantially equal to the ground speed of said apparatus;

heating means for applying heat against the plastic film by said first distal end sufficient to substantially melt each of said holes in the plastic film as said apparatus travels over the plastic film.

2. A planting hole burning apparatus as set forth in claim 1, wherein:

said heating means is a flame from a torch, said flame exiting from said first distal end, said first distal end being substantially open such that the flame contacts the plastic film to burn each of said holes.

3. A planting hole burning apparatus as set forth in claim 2, further comprising:

a rotor enclosure connected to said frame and having upstanding side walls which surround said rotor and a flame discharge opening at a lower surface of said enclosure, said flame discharge opening positioned in close proximity above the plastic film;

said flame discharge opening oriented and sized in length for permitting said flame to exit said enclosure and to strike and burn each of said holes during a predetermined arcuate rotation of said rotor.

4. A planting hole burning apparatus as set forth in claim 3 wherein:

said enclosure is open at an upper end thereof for releasing excess heat buildup within said enclosure.

5. A planting hole burning apparatus as set forth in claim 2, further comprising:

a second distal end of said rotor also for discharging said flame, said second distal end angularly positioned about said axis from said first distal end;

a flame blocking means positioned in close proximity to each said rotor distal end when radially aligned one to another for momentarily blocking flame discharge from one said distal end when the other said distal end is burning one of said holes.

6. A planting hole burning apparatus as set forth in claim 1, wherein:

said heating means is a flame from a torch, said flame directed against a substantially continuous surface which defines said first distal end, said continuous surface being in direct contact with the plastic film.

7. A planting hole burning apparatus as set forth in claim 1, wherein:

said heating means heats a substantially continuous surface which defines said first distal end, said continuous surface being in direct contact with the plastic film.

8. A method of forming a row of spaced planting holes through a plastic film positioned atop a seed growing bed comprising the steps of:

A. providing a planting hole burning apparatus comprising:

a frame supported above the bed by spaced rotatable ground engaging wheels;

a heat dispensing rotor connected to said frame for rotation about an axis substantially transverse to a direction of travel of said apparatus;

drive means connected between one of said wheels and said rotor for rotating said rotor at a rotational speed corresponding to a ground speed of said apparatus whereby a distal end of said rotor passes in close proximity to the plastic film beneath said apparatus at an arcuate speed substantially equal to the ground speed of said apparatus;

heating means for applying heat against the plastic film by said rotor distal end sufficient to substantially melt each of said holes in the plastic film as said apparatus travels over the plastic film;

B. operating said apparatus along a seed growing bed covered with the plastic film.

9. A planting hole burning apparatus for forming a row of spaced planting holes through a plastic film positioned atop a seed growing bed comprising:

a frame supported above the bed by spaced rotatable ground engaging wheels;

a heat dispensing rotor connected to said frame for rotation about an axis substantially transverse to a direction of travel of said apparatus;

drive means for propelling said apparatus over ground and for rotating said rotor whereby, during each revolution of said rotor, a first distal end of said rotor passes in close proximity to the plastic film beneath said apparatus;

heating means for applying heat against the plastic film by said first distal end sufficient to substantially melt each of said holes in the plastic film as said apparatus travels over the plastic film.

10. A planting hole burning apparatus as set forth in claim 9, wherein:

said heating means is a flame from a torch, said flame exiting from said first distal end, said first distal end being substantially open such that the flame contacts the plastic film to burn each of said holes.

11. A planting hole burning apparatus as set forth in claim 10, further comprising:

a rotor enclosure connected to said frame and having upstanding side walls which surround said rotor and a flame discharge opening at a lower surface of said enclosure, said flame discharge opening positioned in close proximity above the plastic film;

said flame discharge opening oriented and sized in length for permitting said flame to exit said enclosure and to strike and burn each of said holes during a predetermined arcuate rotation of said rotor.

12. A planting hole burning apparatus as set forth in claim 11, wherein:

said enclosure is open at an upper end thereof for releasing excess heat buildup within said enclosure.

13. A planting hole burning apparatus as set forth in claim 10, further comprising:

a second distal end of said rotor also for discharging said flame, said second distal end angularly positioned about said axis from said first distal end;

a flame blocking means positioned in close proximity to each said rotor distal end when radially aligned one to another for momentarily blocking flame discharge from one said distal end when the other said distal end is burning one of said holes.

14. A planting hole burning apparatus as set forth in claim 9, wherein:

said heating means is a flame from a torch, said flame directed against a substantially continuous surface which defines said first distal end, said continuous surface being in direct contact with the plastic film.

15. A planting hole burning apparatus as set forth in claim 9, wherein:

said heating means heats a substantially continuous surface which defines said first distal end, said continuous surface being in direct contact with the plastic film.

* * * * *